(12) United States Patent
Salonen

(10) Patent No.: US 11,004,114 B2
(45) Date of Patent: May 11, 2021

(54) COMPONENTS, SYSTEM, PLATFORM AND METHODOLOGIES FOR MEDIATING AND PROVISIONING SERVICES AND PRODUCT DELIVERY AND ORCHESTRATING, MEDIATING AND AUTHENTICATING TRANSACTIONS AND INTERACTIONS

(71) Applicant: BOOKIT OY AJANVARAUSPALVELU, Helsinki (FI)

(72) Inventor: Jukka Kalevi Salonen, Luhtajoki (FI)

(73) Assignee: Bookit OY

( * ) Notice: Subject to any disclaimer, the term of this patent is extended or adjusted under 35 U.S.C. 154(b) by 1573 days.

(21) Appl. No.: 14/638,501

(22) Filed: Mar. 4, 2015

(65) Prior Publication Data
US 2015/0178785 A1   Jun. 25, 2015

Related U.S. Application Data

(63) Continuation-in-part of application No. 10/734,352, filed on Dec. 11, 2003, now Pat. No. 9,313,161, (Continued)

(30) Foreign Application Priority Data

Aug. 21, 2001   (FI) ..................... 20011680

(51) Int. Cl.
*G06Q 30/02*   (2012.01)
*G06Q 10/02*   (2012.01)
(Continued)

(52) U.S. Cl.
CPC ........ *G06Q 30/0267* (2013.01); *G06Q 10/02* (2013.01); *G06Q 10/025* (2013.01);
(Continued)

(58) Field of Classification Search
CPC .. G06Q 30/0267; G06Q 10/02; G06Q 10/025; G06Q 20/322; G06Q 20/40; H04W 4/12
(Continued)

(56) References Cited

U.S. PATENT DOCUMENTS 5,592,666 A   1/1997   Perez
5,740,230 A *   4/1998   Vaudreuil ............... G06F 9/546
                                                     379/88.22
(Continued)

FOREIGN PATENT DOCUMENTS

CN   1675637 A   9/2005
EP   0881802 A1   2/1998
(Continued)

OTHER PUBLICATIONS

"French Venture Launches Innovative Procedure for Electronic Signatures." Feb. 2, 2001. Europolitics, Tech Europe. p. 203. (Year: 2001).*
(Continued)

*Primary Examiner* — Jeff Zimmerman
*Assistant Examiner* — Hunter A Molnar
(74) *Attorney, Agent, or Firm* — Barnes & Thornburg LLP

(57) ABSTRACT

A system, methodologies and components of an inventive Mobile Engagement Platform enable cross channel transaction processing, authentication, tokenization, security, and data aggregation.

34 Claims, 2 Drawing Sheets

Related U.S. Application Data which is a continuation of application No. 10/227,194, filed on Aug. 21, 2002, now Pat. No. 7,406,429.

(51) Int. Cl.

| | | |
|---|---|---|
| *G06Q 20/40* | (2012.01) | |
| *G06Q 30/06* | (2012.01) | |
| *H04W 12/06* | (2021.01) | |
| *H04W 4/12* | (2009.01) | |
| *G06Q 20/32* | (2012.01) | |
| *H04M 3/42* | (2006.01) | |

(52) U.S. Cl.
CPC ........... *G06Q 20/322* (2013.01); *G06Q 20/40* (2013.01); *G06Q 30/0601* (2013.01); *H04M 3/42382* (2013.01); *H04W 4/12* (2013.01); *H04W 12/06* (2013.01)

(58) Field of Classification Search
USPC .......................................................... 705/5
See application file for complete search history.

(56) References Cited

U.S. PATENT DOCUMENTS

| | | | |
|---|---|---|---|
| 5,838,965 | A | 11/1998 | Kavanagh et al. |
| 5,940,818 | A | 8/1999 | Malloy et al. |
| 5,987,467 | A | 11/1999 | Ross et al. |
| 6,003,036 | A | 12/1999 | Martin |
| 6,047,270 | A | 4/2000 | Joao et al. |
| 6,076,101 | A * | 6/2000 | Kamakura ........... G06Q 10/107 705/14.27 |
| 6,085,100 | A * | 7/2000 | Tarnanen ............ H04W 88/184 340/7.23 |
| 6,104,870 | A | 8/2000 | Frick et al. |
| 6,134,432 | A * | 10/2000 | Holmes ............... H04M 3/5307 340/7.29 |
| 6,169,911 | B1 * | 1/2001 | Wagner ............. H04M 1/72547 455/566 |
| 6,199,076 | B1 | 3/2001 | Logan et al. |
| 6,236,968 | B1 | 5/2001 | Kanevsky et al. |
| 6,539,360 | B1 | 3/2003 | Kadaba |
| 6,560,456 | B1 | 5/2003 | Lohtia et al. |
| 6,564,261 | B1 | 5/2003 | Gudjonsson et al. |
| 6,625,461 | B1 | 9/2003 | Bertacchi |
| 6,639,919 | B2 | 10/2003 | Kroninger et al. |
| 6,772,336 | B1 | 8/2004 | Dixon, Jr. |
| 6,873,688 | B1 | 3/2005 | Aarnio |
| 6,990,332 | B2 | 1/2006 | Vihinen |
| 7,149,537 | B1 | 12/2006 | Kupsch et al. |
| 7,154,060 | B2 | 12/2006 | Rosenbaum et al. |
| 7,222,081 | B1 | 5/2007 | Sone |
| 7,272,662 | B2 | 9/2007 | Chesnais et al. |
| 7,406,429 | B2 | 7/2008 | Salonen |
| 7,451,118 | B2 | 11/2008 | McMeen et al. |
| 7,610,208 | B2 | 10/2009 | Salonen |
| 7,610,224 | B2 | 10/2009 | Spiegel |
| 7,619,584 | B2 | 11/2009 | Wolf |
| 7,660,397 | B2 | 2/2010 | Heen et al. |
| 7,844,674 | B2 | 11/2010 | Madams et al. |
| 7,996,023 | B2 | 8/2011 | McGary et al. |
| 8,050,664 | B2 | 11/2011 | Salonen |
| 8,055,508 | B1 * | 11/2011 | Leblang ............... B65G 1/1373 705/1.1 |
| 8,145,245 | B2 | 3/2012 | Aulu |
| 8,359,242 | B2 | 1/2013 | Guillot |
| 2001/0037264 | A1 | 11/2001 | Husemann et al. |
| 2001/0049785 | A1 | 12/2001 | Kawan et al. |
| 2002/0028686 | A1 | 3/2002 | Kagi |
| 2002/0032589 | A1 | 3/2002 | Shah |
| 2002/0035539 | A1 | 3/2002 | O'Connell |
| 2002/0059146 | A1 | 5/2002 | Keech |
| 2002/0080822 | A1 | 6/2002 | Brown et al. |
| 2002/0104007 | A1 | 8/2002 | Moodie et al. |
| 2002/0111914 | A1 | 8/2002 | Terada et al. |
| 2002/0128908 | A1 | 9/2002 | Levin et al. |
| 2002/0165000 | A1 | 11/2002 | Fok |
| 2002/0173319 | A1 | 11/2002 | Fostick |
| 2002/0178122 | A1 | 11/2002 | Maes |
| 2002/0180696 | A1 | 12/2002 | Maritzen et al. |
| 2002/0184509 | A1 | 12/2002 | Scheidt et al. |
| 2002/0188562 | A1 | 12/2002 | Igarashi |
| 2002/0191795 | A1 | 12/2002 | Wills |
| 2003/0005126 | A1 | 1/2003 | Schwartz et al. |
| 2003/0101071 | A1 | 5/2003 | Salonen |
| 2003/0163536 | A1 | 8/2003 | Pettine, Jr. |
| 2003/0211844 | A1 | 11/2003 | Omori |
| 2004/0097247 | A1 | 5/2004 | Vilkuna et al. |
| 2004/0128158 | A1 | 7/2004 | Salonen |
| 2004/0128173 | A1 | 7/2004 | Salonen |
| 2004/0139318 | A1 | 7/2004 | Fiala et al. |
| 2004/0157628 | A1 | 8/2004 | Daniel et al. |
| 2004/0185883 | A1 | 9/2004 | Rukman |
| 2004/0198322 | A1 | 10/2004 | Mercer |
| 2004/0203619 | A1 | 10/2004 | Tissot |
| 2005/0027608 | A1 | 2/2005 | Wiesmuller et al. |
| 2005/0044042 | A1 | 2/2005 | Mendiola et al. |
| 2005/0054286 | A1 | 3/2005 | Kanjilal |
| 2005/0065995 | A1 | 3/2005 | Millstein et al. |
| 2005/0102230 | A1 | 5/2005 | Haidar |
| 2005/0171738 | A1 | 8/2005 | Kadaba |
| 2005/0246209 | A1 | 11/2005 | Salonen |
| 2005/0268107 | A1 | 12/2005 | Harris et al. |
| 2006/0010085 | A1 | 1/2006 | McMeen et al. |
| 2006/0040682 | A1 | 2/2006 | Goertz et al. |
| 2006/0075139 | A1 | 4/2006 | Jungck |
| 2006/0131385 | A1 | 6/2006 | Kim |
| 2006/0168064 | A1 | 7/2006 | Huynh et al. |
| 2006/0224407 | A1 | 10/2006 | Mills |
| 2006/0271551 | A1 | 11/2006 | Suojasto |
| 2007/0010266 | A1 | 1/2007 | Chaudhuri |
| 2007/0047533 | A1 | 3/2007 | Criddle et al. |
| 2007/0105536 | A1 | 5/2007 | Tingo, Jr. |
| 2007/0123246 | A1 | 5/2007 | Daniel et al. |
| 2007/0135101 | A1 | 6/2007 | Ramati et al. |
| 2007/0143230 | A1 | 6/2007 | Narainsamy et al. |
| 2007/0239578 | A1 | 10/2007 | Klemens |
| 2007/0288215 | A1 | 12/2007 | Goldman |
| 2008/0147408 | A1 | 6/2008 | Da Palma |
| 2008/0256191 | A1 | 10/2008 | Murphy et al. |
| 2008/0285475 | A1 | 11/2008 | Menditto |
| 2008/0317224 | A1 | 12/2008 | Salonen |
| 2009/0104925 | A1 | 4/2009 | Aula |
| 2009/0175422 | A1 | 7/2009 | Marics et al. |
| 2009/0264100 | A1 | 10/2009 | Sapir et al. |
| 2009/0281929 | A1 | 11/2009 | Boitet et al. |
| 2010/0030689 | A1 | 2/2010 | Ramos et al. |

FOREIGN PATENT DOCUMENTS

| | | | |
|---|---|---|---|
| EP | 0967754 A2 | 12/1999 | |
| EP | 1065899 A1 | 3/2001 | |
| EP | 1458201 A1 | 9/2004 | |
| EP | 1546938 A1 | 6/2005 | |
| EP | 0899918 B1 * | 4/2010 | ........... G06Q 10/107 |
| FI | 20011680 A | 2/2003 | |
| FI | 000117663 B | 12/2006 | |
| FI | 20060387 A | 10/2007 | |
| FI | 000118586 B | 12/2007 | |
| GB | 2391646 A | 11/2004 | |
| GB | 2435565 A | 8/2007 | |
| KR | 20040013261 A | 2/2004 | |
| WO | 9706603 A2 | 2/1997 | |
| WO | 0041102 A2 | 7/2000 | |
| WO | 0052601 A1 | 9/2000 | |
| WO | 01013299 A2 | 2/2001 | |
| WO | WO-0113298 A2 * | 2/2001 | ............. G06Q 30/06 |
| WO | 0139033 A1 | 5/2001 | |
| WO | 0153991 A1 | 7/2001 | |
| WO | 2002067602 A1 | 8/2002 | |
| WO | 2004019223 A1 | 3/2004 | |
| WO | 2006122399 A1 | 11/2006 | |
| WO | 2007063179 A1 | 6/2007 | |
| WO | 2007122292 A1 | 11/2007 | |

(56) References Cited

FOREIGN PATENT DOCUMENTS

| WO | 2007125171 A1 | 11/2007 |
| WO | 2008017695 A2 | 2/2008 |
| WO | 2010000949 A1 | 1/2010 |

OTHER PUBLICATIONS

Bmd wireless AG; Wirelss Application Messaging Serivce; Unknown 2004.

Content Gateway, Version 4.0; Development and Billing Manual; Jan. 1, 2005, Telia Sonera Finland Oy; www.sonera.fi/files/sonera.fi/.

Elisa Plc's Press Release; BookIT Ltd. and Elisa Implement a Handy Mobile Phone-Enabled Check-In Service for Finnair; Jun. 9, 2004; www.elisa.fi.

Elisa Plc's Press Release; Innovative Solution Receives 2004 European Good Practice Award in Occupational Health and Safety and the appendix BookIT case.pdf; Nov. 22, 2004.

Empower Interactive Group Ltd.; Virtual Mobile Redirector—Product Information Document; Unknown 2001.

Finnair Plc's Press Release; Finnair to Introduce the World's Easiest Check-In with a Text Message; Jun. 9, 2004; www.bookit.net/news.

Finnish Search Report; dated May 4, 2006.

Finnish Search Report; dated Jun. 3, 2009.

Kauppalehti; Mobiilipalvelujen Oltava Yksinkertaisia; BookIT:n Jukka Salonen uskoo tavallisiin tekstiviesteihin; Heikki Nenonen; Jun. 9, 2005; p. 19.

Mobileway; Mobileway Launches its Mobile Transaction Tracker Solution—An Interactive Platform to Authenticate Macropayment Made by Mobile Consumers; Jul. 2002; pp. 1-2; United States.

Mouly et al.; The GSM System for Mobile Communications; Unknown 1992; pp. 556-560; Palaiseau.

Penttinen; GSM-tekniikka; WSOY; Unknown 1999; pp. 155-157, 222 and 331-332; Porvoo.

Verkkouutiset; Sonera Tarjoaa Matkaviestinoperaattoreille Content Gateway—Palvelualustaa; February 21, 2001; www.verkkouutiset.fi.

\* cited by examiner

COMPONENTS, SYSTEM, PLATFORM AND METHODOLOGIES FOR MEDIATING AND PROVISIONING SERVICES AND PRODUCT DELIVERY AND ORCHESTRATING, MEDIATING AND AUTHENTICATING TRANSACTIONS AND INTERACTIONS

PRIORITY CLAIM AND CROSS REFERENCE

This patent application claims priority, as a continuation-in-part application, to U.S. patent application Ser. No. 10/734,352, filed Dec. 11, 2003, entitled "BOOKING METHOD AND SYSTEM," which is a continuation of U.S. patent application Ser. No. 10/227,194, filed Aug. 21, 2002, entitled "BOOKING METHOD AND SYSTEM," now U.S. Pat. No. 7,406,429, which claims priority to Finnish Patent Application No. 20011680, filed Aug. 21, 2001, the disclosures of which are incorporated herein by reference in their entirety.

FIELD

Disclosed embodiments relate to a system, methodologies and components that enable cross channel transaction processes

BACKGROUND OF THE INVENTION

Services that are booked or used via the Internet are constantly increasing. The Internet enables one to use several on-line services such as services connected to banks, health services, travel agencies, vehicle maintenance, and so on.

The increasing popularity of mobile computing and communications devices introduce new challenges to services on the Internet. Mobile terminals are able to deliver information to users when needed and where needed. Users want ubiquitous access to information and applications from the device at hand. They also want to access and update this information wherever they happen to be.

It is important to notice, however, that not all the terminals will be mobile. Future services must be able to communicate with a large variety of terminal devices, both those that are mobile and those that are not. Different terminal devices have very different capabilities.

The interoperability of different services and terminal devices has conventionally required standards on several levels. Additionally, product and service providers have multiple different and usually quite complex user interfaces. For example, if a customer wants to both make an appointment with a dentist and book a taxi to take him or her there, the customer needs to enter all the booking information to both booking systems in different ways.

One more problem is that it becomes challenging to manage customer communication. For example, if a customer has been given a number of questions. For example, it makes sense to use Short Message Service (SMS) or text messages to ask a customer which option he or she chooses, because in many countries, like in Finland, it is very common to communicate with SMS text messages and they create revenues to operators. However, if a customer replies to several inquiries by sending a number of text messages, it can be difficult to determine which answer corresponds to a certain question because the reply does not automatically include a reference to the question. For example, say, a service asks a customer if he or she wants to reserve-in addition to a flight ticket-also a taxi and a hotel room, and the customer replies "yes" to one question but "no" to the other, the service does not necessarily know which offer the customer has accepted.

SUMMARY

Disclosed embodiments relate to a system, methodologies and components that enable cross channel transaction processes and communication between users and service/product providers and other third parties.

Disclosed embodiments provide cross channel authentication and transaction management that improve customer experiences, reception to offers and ultimate satisfaction with authentication and transaction processes by using cross channel and multi-factor authentication that provide a higher level of security while reducing perceived complexity of the process to the user.

Disclosed embodiments provide an inventive Mobile Engagement Platform (MEP) and constituent components and methodologies that leverage initial use of less expensive marketing channels to more effectively target use of more expensive marketing channels for conversion into customers.

Disclosed embodiments relate to a system, methodologies and components that enable cross channel transaction processes that culminate in a user authorizing a charge by responding to an SMS message at their mobile phone with a prescribed (and varying) response format included in the SMS message.

Thus, in at least one implementation of a disclosed embodiment, an inventive MEP includes a secure, seamless and omni-channel messaging system, standardized APIs to interface with CRM systems, Enterprise Resource Planning (ERP) systems, booking and payments systems, and a federated payment system utilizing tokenized credentials.

In accordance with at least implementation of a disclosed embodiment, a user's mobile device interacts with the inventive MEP to act as a universal remote controller for providing instructions, authorizations and otherwise communicating with one or more service/product providers over one or more communication networks.

In accordance with at least implementation of a disclosed embodiment, a system, methodologies and components enable requesting, authorizing and/or processing transactions between a plurality of users who are each communicating with a mobile device and a plurality of service providers, wherein communication is performed by receiving and sending short text messages.

BRIEF DESCRIPTION OF THE FIGURES

In the following section, the invention will be described in detail by the aid of a few examples of its embodiments, in which.

DETAILED DESCRIPTION

Figure 1:
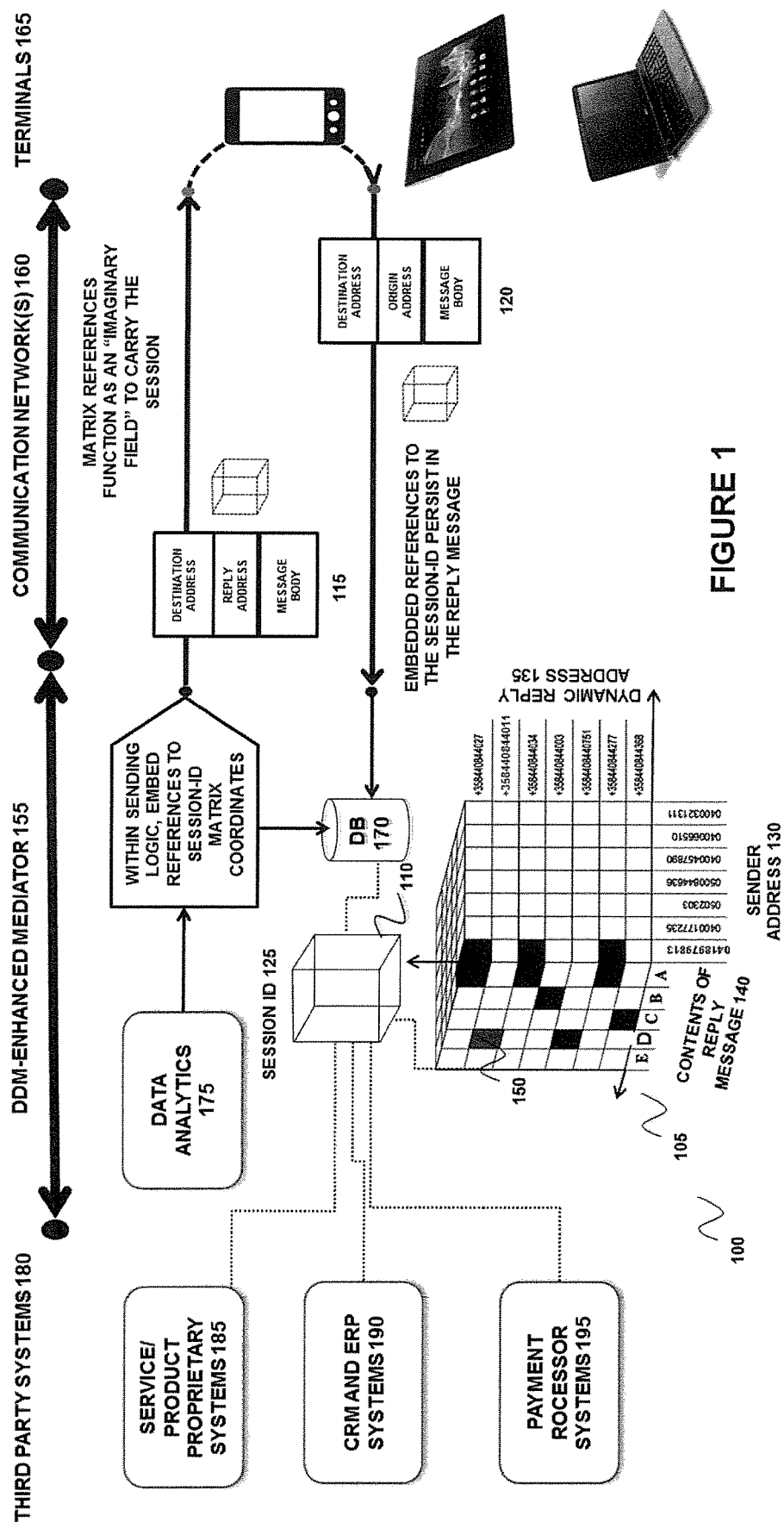
FIG. 1 illustrates one example of a disclosed embodiment of the inventive MEP (and its constituent components) in the context of how the MEP components interact with users and service/product providers.

With smartphone and tablet applications now an integral part of everyday life, conventional MEPs enable marketing organizations and enterprises to more effectively engage with their constituents through contextual awareness, integration with third party systems and a more holistic understanding of the user's context and location. Despite the millions of apps available in the mobile ecosystem, users typically interact only with a handful, requiring enterprises to formulate new strategies for user engagement.

The convergence of cloud technology, big data, and mobile communication now enables a shift in digital marketing from generic targeting with a campaign focus to contextual interaction with predictive, one-to-one, personalized content that is relevant to users' physical and digital environment "in the moment."

Thus, in accordance with at least implementation of a disclosed embodiment, a user's mobile device interacts with the inventive MEP to act as a universal remote controller for providing instructions, authorizations and otherwise communicating with one or more service/product providers over one or more communication networks.

By combining these features, the disclosed embodiments of the inventive MEP both measure and demonstrate greater return on investment by engaging customers with the right message at the right time to drive higher response rates to mobile CRM campaigns and deliver a superior customer experience. Such an inventive MEP has particular utility to both customers and service/product providers alike because it enables that ability to make, manage and change appointments, reservations, or other bookings and transactions.

By reconfiguring the functionality of a customer's mobile device as a universal remote controller, the value of installed applications is increased because users interact with their mobile applications more regularly and for longer periods of time. This promotes customer engagement, which promotes brand value, while extending the lifespan of those applications: through better user feedback and a virtuous cycle of positive user engagement.

Disclosed embodiments can provide, among other things, an inventive MEP and constituent components and methodologies that leverage initial use of less expensive marketing channels to more effectively target use of more expensive marketing channels for conversion into customers. Thus, as explained herein, product/service providers, CRM service providers and/or software can utilize a dynamically focused product/service offering using multiple communications channels.

For example, an initial stage of a campaign may include sending a large distribution electronic mail message sent out to a large number of recipients with a link to an Internet site where users may register for a trial or free service or product. As part of that registration, the user may be prompted to enter various personal information including, for example, name, address, user's mobile phone number, etc. Subsequently, a subsequent stage of the campaign may include transmission of an SMS message offer or inquiry to the mobile phone numbers of those who responded to the initial stage and including additional, related or unrelated offerings. Further stages of campaigns may be triggered for those individuals who responded to the SMS message offer or inquiry, e.g., voice calls from CRM personnel, postal mail, etc.

This dynamically focused offering provided over multiple communications channels is enabled by an inventive MEP that can utilize multiple channels to perform authentication and process authorizations for transactions: electronic mail in combination with SMS messaging, interaction with a web-site in combination with SMS messaging, voice calls in combination with SMS messaging, etc. In this way, the inventive MEP and its constituent methodologies and components leverage the personal nature of a user's mobile device to establish authentication and security while delivering marketing campaigns that increase user engagement and customer conversion.

Disclosed embodiments utilize associations resulting from the use of technology developed by the present inventor and patented in U.S. Pat. No. 7,406,429, entitled "Booking method and system," and filed Jul. 29, 2008 (hereafter referred to as the "'429 Patent" and incorporated by reference in its entirety). The '429 Patent discloses a method and system for booking reservations in a booking system and synchronizing bookings among several booking systems, wherein a dialogue is used to manage information used to mediate communications between a user, at least one booking system, and at least one service provider. Because of the relatively personal nature of a mobile phone, that '429 Patent disclosed use of a user's mobile phone to provide authentication that leverages the ease of use of SMS messages.

However, an issue with SMS messages is the ability to manage multiple messages back and forth with a user. For example, it becomes challenging to manage user replies, for instance, when a user has been given a number of queries to reply to. Prior to the '429 Patent, it was conventionally difficult to determine which replies corresponded to specific queries because an SMS message reply does not automatically include a reference to the query it pertained to. Accordingly, conventional attempts to execute financial transactions wherein customers utilize mobile terminals without additional proprietary software had been handicapped by limitations of the conventional mobile communication protocols, such as SMS.

Indeed, the SMS protocol provides no standardized manner for authenticating mobile users or managing sessions. The present inventor recognized that this lack of standardized authentication techniques left systems vulnerable to fraud, while providing no mechanism for standardized session management. However, the present inventor further recognized that, to foster adoption of technology, this need for session management, fraud prevention and introduction of new services should not be overly complex.

As a result, the '429 Patent addressed the need for increases security and session management for SMS messages through a mediator's use of a Dynamic Dialogue Matrix (DDM), which enables authentication that is neither mobile device specific or service/product provider specific and is network agnostic. Using the inventive MEP disclosed in the '429 Patent, there is no need to put software on a user's mobile device and also no need to share payment information with a service provider.

With this understanding in mind, it should be understood that the term, "DDM-enhanced mediator" (as used herein) refers to the mediator of the '429 Patent configured with additional functionality as disclosed herein. A DDM-enhanced mediator is a component of disclosed embodiments of an inventive MEP and performs functionality in accordance with the disclosed methodologies to orchestrate transactions, bookings, reservations, etc. between parties. For example, in accordance with at least one disclosed embodiment, the DDM-enhanced mediator tracks and orchestrates several bookings from different service/product providers in a single parent session with timely "pushed" communications (e.g., messages) sent to the customer to streamline and simplify their travel experience. The term "pushed" refers to communications that are not expressly requested by a communication recipient.

The DDM-enhanced mediator may also provide, for service/product providers, semantics, translation and synchronization services needed for communication of the information needed for a customer to complete a transaction with a service provider. Thus, it should be appreciated that the product/service provider's booking services and the mediator may both be implemented using software applications operating on network servers coupled over one or more communication networks such as the Internet or a private Intranet.

The term "customers" or "users" includes users communicating on various hardware equipment, in particular, mobile devices such a mobile telephones capable of receiving short text messages, e.g., SMS messages. It should be appreciated that the DDM-enhanced mediator may communicate with mobile device users through an SMS gateway, such as are operated by mobile telephone providers as well known today.

As explained in the '429 Patent, the DDM-enhanced mediator communicates with customers using dialogues. Dialogues are short messages which present information to the customer and allow a simple reply. Dialogues can provide users with simple choices such as yes/no or to allow a selection from an ordered list. Dialogues can also be one way, such as to acknowledge a reservation, accept an offer or authorize a transaction.

A user's mobile device can reliably be considered a trusted device if it is considered an extension of the user. For example, only privately used devices may be considered trusted devices such as mobile phones or the emerging market for wearable devices.

In accordance with the disclosed embodiments, registration of trusted personal devices can take place only once the customer has authenticated himself sufficiently either on-line or in-person. At that time, the customer may submit a personal address of their device (e.g., a mobile phone number). After entering their mobile number, a message may be sent to the customer at the mobile phone number, wherein the message has a specified reply address. Based on the user replying to that reply address from their mobile number, within a specific period of time, the device may then be authorized within the inventive MEP by the DDM-enhanced mediator as a trusted personal device.

Once this registration has been completed, the inventive MEP can authenticate the user and secure a transaction end to end by removing target data from transaction communications between parties to the transaction; this is done by securing that target data (e.g., financial information) in the DDM-enhanced mediator. The DDM-enhanced mediator can secure that target data to keep is secure from the transaction parties and also third parties. As a result, the DDM-enhanced mediator communicates with the transaction parties (both customers and service/product providers) without the need to share the target data in communications with transaction parties that enable the transaction. In this way, the DDM-enhanced mediator authenticates communication from one transaction party for the other transaction party based on the DDM-enhanced mediator's prior-established and secure relationship with each of the parties.

Since usernames and passwords are no longer considered to provide adequate security for on-line transactions, security experts recommend banks and merchants use multi-factor authentication. Disclosed embodiments of the inventive MEP can provide a second verification of purchase details combined with authentication that a customer has possession of the mobile device. As a result, the inventive MEP provides better ease of use and security than conventional One Time Password (OTP) or Mobile Transaction Authentication Number (MTAN) protocols.

Unlike such conventional solutions, which require a user to enter a four to six digit OTP or MTAN, the disclosed embodiments of the inventive MEP are intuitive for the user and simply replying to the pushed message provides a sufficient level of authentication. Likewise, the disclosed embodiments of the inventive MEP can protect against man-in-the-middle attacks be providing a mechanism for secondary out-of-band verification.

Conventionally, faking origination addresses (i.e., "spoofing") such as mobile numbers, electronic mail addresses, and IP addresses is trivial. Therefore, relying on the mobile number or similar static address as a "possession" factor is insecure. However, not all addresses are similar—some are "hard" meaning that the address is tied to hardware, and some are "soft" meaning that they are tied to a software account, which may be accessed from more than one device. A mobile number, or International Mobile Subscriber Identity (IMSI) number is considered a hard address because it is tied to a specific Subscriber Identity Module (SIM) card. Likewise, an International Mobile Station Equipment Identity (IMEI) address identifies a particular mobile phone and a Media Access Control (MAC) address identifies a particular computer. An example of a soft address is an electronic mail address.

Hackers have widely known techniques for sending spoofed messages from both hard and soft addresses. Likewise, it is possible to intercept received messages from soft addresses such as electronic mail of the hacker has phished, stolen, or otherwise knows the username/password combination. A soft address, therefore, only authenticates the user on what they know, not on what they have. However, it is far more difficult to fake receiving messages to a hard address (Network operators employ effective "anti-cloning" to prevent against this).

Man-in-the-Middle (MITM) and Man-in-the-Browser (MITB) attacks are particularly challenging forms of eCommerce and eBanking fraud. However, MITM and MITB attacks escape most forms of user authentication, even two-factor authentication, because the legitimate user is duped into providing authentication data requested by the service provider, and the attacker simply passes through those credentials to the real service provider while changing the details of the transaction (e.g., destination account and amount).

To overcome such attacks, multi-factor authentication can be performed by the DDM-enhanced mediator simultaneously with the processing of a requested transaction. However, the multi-factor authentication performed by the DDM-enhanced mediator is performed out-of-band (e.g., via a different communication channel such as a text message) to provide a secondary transaction verification. In this way, a legitimate user notices that the details of a fraudulent transaction, e.g., on the Internet do not match the details of an (actual) transaction provided out-of-band and is thereby alerted to the fraud.

A transaction may involve a sequence of dialogues each involving a simple response. Because such dialogues can involve asynchronous communication by messages, the DDM-enhanced mediator (included in the disclosed embodiments of the inventive MEP), tracks sessions and simultaneously authenticates that a user has possession of a registered mobile device by embedding each message with an "imaginary session-id field" that persists throughout the transmission of messages between the DDM-enhanced mediator and the user. In implementation, the session id can persist between sent and received messages without actually being transmitted across the network. In other words, no additional data is embedded into a message body or headers. Rather, bytes of data to be included in messages are repurposed to serve additional functionality.

This may be achieved by layering additional purpose and logic onto existing data in the headers and body (at a minimum, the sender and receiver fields). This concept is illustrated in FIG. 1, which illustrates one example of the inventive MEP 100 in the context of how the MEP components interact with users and service/product providers. As shown in FIG. 1, matrix coordinates 105 creating an imaginary field 110 that persist between message pairs 115, 120.

The "imaginary field" which carries the session id 125 can be constructed, e.g., from the sender address 130, reply address 135, and reply contents 140, where each variable represents a linear axis of an N-dimensional matrix. The cells 150 of the conceptualized matrix contain the session id 125 whose coordinates are embedded in the sending logic of each sent message 115 and persist in each reply message 120.

Authentication is achieved through a random, pseudorandom or otherwise unsystematic selection and allocation of the reply address 135, and/or reply options, and/or through random allocation of any other field that may persist between message pairs (or message groups). In at least some implementations, dynamically selected reply addresses 135 may provide the best option for authentication. The fact that a reply message 120 arrives to the correct address provides authentication of the "possession factor" for authentication.

As mentioned above, dialogues can also be one way, such as to acknowledge a reservation, accept an offer or authorize a transaction. However, a transaction may involve a sequence of dialogues each involving a simple response. Thus, using only the address fields for session management and authentication frees up the message body, enabling free-form responses, or simple response options such as Y/N, one-tap transactions, or any other form of single-action ordering.

In this way, the DDM-enhanced mediator may use the identifier of the party's mobile device as a first factor for authentication and optionally provide additional factors to provide multi-factor authentication. For example, the DDM-enhanced mediator may vary a reply address to which communication from the party's mobile device is sent to the DDM-enhanced mediator. Additionally, the DDM-enhanced mediator may vary instructions for responding to communication from the DDM-enhanced mediator by the party's mobile device.

The DDM enables the ability to establish associations for messages sent to and received from a user. These associations may be managed in a number of different ways. For example, in accordance with at least one embodiment, messages communicated to the user may be sent with varying requested response symbols, e.g., "reply with letter Y to accept," "reply with number 1 to accept," "reply with "yes" to accept", as disclosed in U.S. Pat. No. RE44,073, the disclosure of which being incorporated herein by reference. Thus, one implementation of the DDM-enhanced moderator may establish a syntax wherein the one letter responses mean different things depending on the stage/phase of a query process, the organization on behalf of which the query has been sent, etc.

The DDM-enhanced mediator may perform semantic analysis of responses received in reply to query messages communicated to users, e.g., when such query messages include varying requested response symbols. This analysis enables the ability to determine whether a response message includes an appropriate response to the sent query, e.g., semantic analysis would indicate something is not correct if query message requests "reply with the letter Y to accept charges and charge credit card ending in 1234," but reply includes 7:30 pm.

When the dialogue involves more than one reply, the number of possible reply option combinations grows exponentially, providing ever-stronger authentication sequences.

Though of conceptually, the disclosed embodiments of the inventive MEP can use server-side authentication and session management that uses a unique "fingerprint" in each message to track sessions and provide seamless user purchasing. This fingerprint can include at least the unique combination of sender address 130 and dynamically generated reply address 135, and may also include reply-content 140. Where each of these field variables is considered as a unique virtual dimension of a matrix—the correct session can be identified by the DDM-enhanced mediator 155 as a specific point within that matrix. The elegance of the solution is such that each individual field continues to function exactly as intended by the network protocol for the network (s) 160 on which the communications, e.g., messages, are being sent to customers' terminals 165—yet serve secondary repurposing for session tracking and authentication. The terminals 165 may include mobile phones, wearable computing devices, laptops, tablets, personal computers, etc., and the DDM mediator 155 can communicate with those devices using email, messaging, voice, etc. over one or more communication networks 160. As a result, the disclosed embodiments can provide an inventive MEP that is network and protocol agnostic since all communication (e.g., messaging) schemes include at least a sender address and reply address, and usually also contain a message body.

Furthermore, most communication protocols contain a message body, in which the payload and part of the unique fingerprint can also be inserted to the reply content—the payload may consist of a single letter response such as Y/N, a conventional challenge/response question or passphrase (though this has not been needed in practice), or could also include biometric data such as voice response, photo, video, retina scan. For the most part, this level of authentication is excessive; however, the DDM, which resides within the DDM-enhanced mediator, can be configured to accommodate highly sophisticated authentication schemes.

In implementation with existing and future communication protocols, the type and size of the payload delivered within the message body may vary depending on the use case and protocol, but fundamentally, the matrix can be configured to support any type or format of content including text, images, sound, video, etc. Furthermore, existing and future protocols that make use of bodiless messages or which allow the body of the message to remain empty can also be used for authentication purposes, for example to authenticate the possession of a device by an end user. Thus, it should be appreciated that the disclosed embodiments have utility in that each individual address field continues to function exactly as intended by the design architects under a given communication or network protocol—yet those fields serve secondary repurposing for session tracking and authentication.

Figure 2:
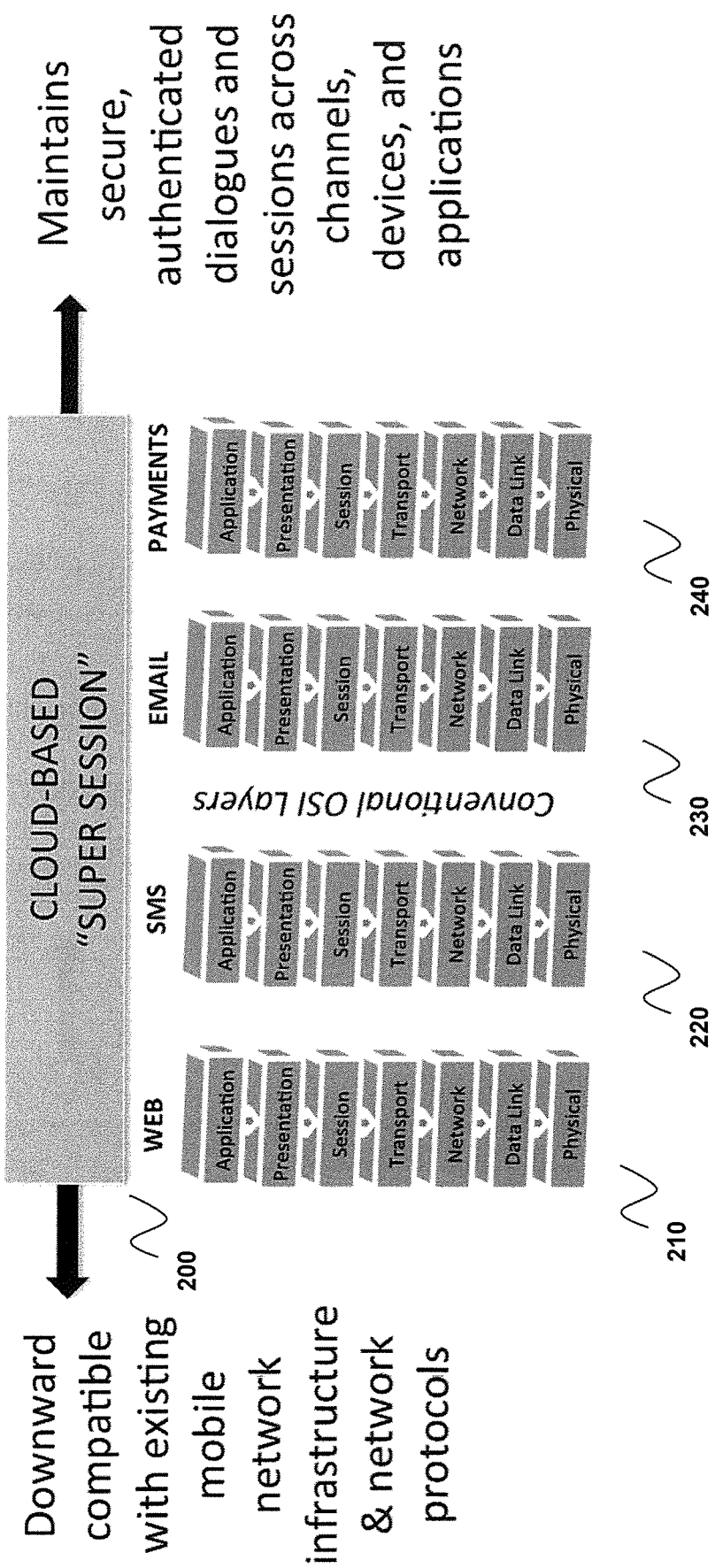
FIG. 2 illustrates how an embodiment of the DDM-enhanced mediator's inventive MEP platform acts as an asynchronous super session layer, keeping persistent sessions alive indefinitely in the cloud.

As disclosed in the '429 Patent, although session management has utility in a single channel environment, e.g., SMS, disclosed embodiments may be implemented further to manage dialogues and sessions that cross over from one channel to another, i.e., cross-channel sessions. More specifically, as shown in FIG. 2, the DDM-enhanced mediator's inventive MEP platform is configured to act as an asynchronous super session layer 200, keeping persistent sessions alive indefinitely in the cloud (e.g., software and services that run on the Internet, other public and private communication networks).

This is possible because the DDM-enhanced mediator is positioned outside idealized Open systems Interconnection (OSI) network models to provide a cross-channel 'super-session' layer 200. The separation of the DDM-enhanced mediator layer 200 from transmission and application layers enables the ability to mediate transactions from the cloud in a manner that is fully backwards compatible with existing infrastructure, protocols, and terminal devices, yet also forward compatible with new advances in mobile networks and devices. This, in turn, makes it possible to coordinate bookings among different product/service provider systems to fill a customer's need, for example, coordination of an airline booking with transportation to the airport. Additionally, the super session layer can unify and manage communications via the web 210, SMS 220, electronic mail 230 and payment processing protocols 240.

In accordance with at least one implementation of a disclosed embodiment, a system, methodologies and components enable cross channel transaction processes that culminate in a user authorizing a charge by responding to an SMS message at their mobile phone with a prescribed (and varying) response format included in the SMS message. Thus, disclosed embodiments have utility based on session management, but also for authentication. There are many conventional authentication solutions that send an OTP or MTAN to a user's mobile device, which they must then type to a computer. Disclosed embodiments may similarly use a hard identifier, but the authentication may be automatic such that the user can simply reply to the message received. This is possible because only a valid user in possession of the device to which the hard address is assigned will know the unique, dynamic combination of the reply address, sender address, valid reply options, and transaction time window as allocated within the DDM-enhanced mediator.

More specifically, because the inventive MEP platform may utilize multi-factor authentication, the inventive MEP also enables aggregation of data for each party to a transaction to further attest to the identity of such parties engaging in transactions and secure transactions involving those parties. The DDM-enhanced mediator aggregates this data by associating transaction data with an address of the party's mobile device. This association enables the DDM-enhanced mediator to associate multiple transactions with different service/product providers and to authenticate the party for the service/product providers.

Thus, as explained in the '429 Patent, the DDM-enhanced mediator is capable of synchronizing and orchestrating proactive offers and messages from multiple service providers and/or booking systems such that the status of one service (e.g., airline) can trigger generating and sending a message-offer for a second service (e.g., hotel), without storing or sharing any private consumer information. The data triggers for initiating a transaction may, optionally, reside at individual service/product providers ERP systems.

However, because the DDM-enhanced mediator has orchestrated offers to the user, it can synchronize and orchestrate offers from multiple service/product providers without having to aggregate private data from fragmented sources.

The DDM-enhanced mediator may also include an extra layer of data including messaging preferences that apply to one or more service/product providers, e.g., a filter that allows users fine-grained control to opt-in or opt-out of offers and messages.

By combining all these features, the DDM-enhanced mediator can provide a persistent relationship with a user that enables the cross-channel, virtual super-session with multiple service/product providers. Such a virtual session may be maintained and secured by the DDM-enhanced mediator using the above-described plurality of multi-factor authentication factors. Moreover, it should be understood that the DDM-enhanced mediator can provide multi-factor authentication on either or both sides of a transaction regardless of device or network capabilities. This is because the DDM-enhanced mediator can communicate via various channels including SMS, electronic mail, or mobile app enabling both sender and receiver to use whatever channel best suites them.

In this way, the disclosed embodiments of the inventive MEP provide a secure, seamless and omni-channel messaging system that enables a continuous session management across multiple devices (e.g., mobile, personal computer, tablet, etc.), multiple channels (e.g., SMS, Internet, Hyper-Text Transfer Protocol (HTTP), voice) and over an extended time period (e.g., encompassing, for example, browsing, booking, upgrade, check-in, post flight, next booking). The disclosed embodiments provide all this while avoiding the need for one-time passwords, single sign-on or other forms of user identification. Thus, the DDM-enhanced mediator is uniquely capable of handling the entire path-to-purchase (proactive offers, offer redemption, payment, customer satisfaction, social recommendations) as a chain of related transactions, handled by a single master session.

Unlike conventional booking scenarios, in which a customer is left to coordinate and manage booking from disparate service providers, the DDM-enhanced mediator is designed such that several bookings from different service providers can be tracked and orchestrated in a single session, with timely pushed messages sent to the customer to streamline and simplify their travel experience. For example, disclosed embodiments enable the exchange and synchronization of information between booking systems and mobile devices to book appointments for health services, travel reservations for hotels, airlines, and rental cars, book tickets for venues, appointments for vehicle maintenance, maintenance for properties, travel and entertainment reservations and ticketing, including check-in, upgrades, disruption messages, change messages and ancillary services. Additionally, the disclosed embodiments can support delivery of information for loyalty and rewards CRM programs, scheduling appointments, services and logistics, subscription renewals, and customer surveys and opinion polls.

By enabling customers to complete transactions through seamless workflow, e.g., "one click" payment, single response to SMS message, prevents "cart abandonment," thereby increasing the conversion from cart to transactions over the Internet. Thus, disclosed embodiments enable cross channel transaction processes that can culminate in a user authorizing a charge by responding to an SMS message at their mobile phone with a prescribed (and optionally varying) response format included in the SMS message. Therefore, the DDM-enhanced mediator is capable to proactively pushing details of bills/invoices to customers through various channels such as electronic mail, SMS, or mobile app, and accept single-action replies to accept payment. Further, the DDM-enhanced mediator is capable to proactively push various options for pre-paid top-up customers when account balances get low, allowing the customers to recharge accounts with credit in various increments (e.g. $10, $20, $30) and maintain service without disruption. The DDM-enhanced mediator is capable to proactively push targeted upgrade and cross-sales offers as a seamless extension of a customer's initial purchase. Customers can accept with a single action. No additional credentials are required for submission because the DDM authenticates the customer's possession of the registered mobile device. Likewise, the DDM can be set to push renewal options to customers' mobile devices and remotely authenticate that the approval comes from the registered device.

Therefore, it should be understood that at least one implementation of the inventive MEP can provide a secure, seamless and omni-channel messaging system, that can correspond with and using standardized APIs to interface with Customer Relations Management (CRM), booking and payments systems, and federated payment systems utilizing tokenized credentials.

The DDM-enhanced mediator uses a token associated with each party to establish, maintain and manage its relationship with each party engaging in transactions. In this way, the DDM-enhanced mediator aggregates data for each party to attest to the identity of such parties engaging in transactions and secures transactions involving those parties. The DDM-enhanced mediator aggregates this data by associating transaction data with an address of the party's mobile device.

This association enables the DDM-enhanced mediator to associate multiple transactions with different service/product providers to authenticate the party for the service/product providers. In this way, the DDM-enhanced mediator uses an identifier of the party's mobile device as one of potentially multiple factors for performing authentication.

Thus, security is further improved because the inventive MEP utilizes tokenized payment account credentials to interface with payment processors. Thus, a customer's credentials need not be shared with the inventive MEP or a product/service provider.

As a result, disclosed embodiments have particular utility in that they reconfigure a user's mobile device into a controller that can manage, authorize and instruct control of locks, financial services (e.g., billing), access to databases and other on-line repositories of information, and services (e.g., postal services, maintenance services, health services), etc.

Accordingly, the DDM-enhanced mediator may be used to mediate interaction using Machines to Machine (M2M) technologies. Often referred to as the "Internet of Things", M2M communication technology is the basis for connecting to, communicating with and controlling everyday devices, including home appliances, personal health monitors industrial equipment, etc. via remote equipment at the direction of a user or another piece of equipment (e.g., a server). In this way, physical and online environments are coupled to enable communication between a whole host of different machines.

Disclosed embodiments also provide an inventive MEP that may be implemented using Application Protocol Interfaces (APIs) for services supporting multiple channel communication. Thus, disclosed embodiments of the inventive MEP enable service/product providers to create and customize targeted mobile engagement campaigns based on contextual interaction and messaging. The inventive MEP can be implemented to deliver highly scalable cloud-based systems requiring minimal human intervention. Thus, the inventive MEP can act as an always on, easy-to-use one-click user interface between brands and their mobile end users, for example, for banking/payments (e.g., purchase verifications and funds transfer alerts, etc.), home automation/security (e.g., installation scheduling, maintenance scheduling, security alerts, customer feedback, etc.), telecommunications and digital media access and delivery (e.g., pre-paid top ups, bill payment alerts, offers, etc.), for example.

Thus, the applications for the DDM-enhanced mediator's transaction handling capabilities are broad—the DDM can be integrated through various API's to any application that requires mobile authentication.

Disclosed embodiments of the inventive MEP enable secure mobile payments and financial protection, including and enabling transaction types such as money transfers, credit and debit card transactions, by eliminating the conventionally necessary step of providing financial data when authorizing a financial transaction. Using the principal that you can't steal what isn't there in the first place, various implementations of the disclosed DDM-enhanced mediator can operate on the premise that no sensitive account details are transmitted between a customer and DDM-enhanced mediator. Rather, transaction details may be stored in the cloud or securely, and only account identifiers such as the last four digits of a credit card need be transmitted over wireless networks.

Further, account credentials may be kept at a payment processor and only an account alias need be stored by the DDM-enhanced mediator. This is possible because the account alias can function to identify an account in question when the alias is submitted to the payment processor.

Thus, payment account details can remain within a secure environment of a payment processor, e.g., a company (often a third party) appointed by a service/product provider, e.g., merchant, to handle credit card transactions for merchant acquiring banks.

In accordance with at least implementation of a disclosed embodiment, a system, methodologies and components enable requesting, authorizing and/or processing transactions between a plurality of users who are each communicating with a mobile device and a plurality of service/product providers, wherein communication is performed by receiving and sending short text messages. Accordingly, the disclosed embodiments of the DDM-enhanced mediator and inventive MEP have particular utility in implementing CRM and marketing campaigns.

Disclosed embodiments of the inventive MEP generate positive customer relationships and add value at each stage of the customer relationship. While the inventive MEP's DDM-enhanced mediator can be engaged by user-initiated behavior, the DDM-enhanced mediator has particular utility for product/service providers who wish to anticipate customer needs with proactive dialogues or offers. The DDM-enhanced mediator acts as a secure intermediary to handle communications and one-click transactions between mobile device users and service/product providers.

As shown in FIG. 1, the DDM-enhanced-mediator 155 is uniquely capable to handle the entire path-to-purchase (e.g., managing proactive offers, offer redemption, payment, customer satisfaction, social recommendations) as a chain of related transactions, handled within a super session. As a result, disclosed embodiments of the inventive MEP 100 may be used to deploy personalized campaigns, SMS polling, enhanced offer delivery and multi-channel location based messages or support federated payments based on analysis of transaction data gathered by the DDM-enhanced mediator stored in a data warehouse 170 (implemented via one or more memory devices for storing data and databases).

Disclosed embodiments of the inventive MEP 100 may be implemented using the data warehouse 170 coupled with data analytics tools 175, which in turn, can interface with various third party systems 180, e.g., service/product provider proprietary systems 185, third party CRM and ERP systems 190 and payment processor systems 195. Such data analytics tools 175 may be implemented using rules-based engines (provided using software running on server(s)) that use proprietary analytics to trigger and process mobile offers. As a result, the data analytics tools 175 may be configured to tailor content, timing and sequencing of messages sent to mobile device user to maximize user response rates and offer conversion. Moreover, the data analytics tools 175 may be coupled to and compatible with third party-provided and/or service/product provider-specific ERP and logistic systems, CRM, loyalty and bookings systems 180.

Moreover, the DDM-enhanced mediator 155 can communicate with both the third party systems 180 and user's terminals 165 with reference to the imaginary field 110 that includes the session ID 125 and enable persistent security, cross-channel session management, tokenization, federation of payments, data aggregation, as described herein.

Implementation of the inventive MEP can also reduce operating costs for product/service providers by increasing automation and improving customer service. For example, using industry standard APIs, the DDM-enhanced mediator can interface directly with a service/product provider's software to automate outcomes (e.g. rerouting of packages for delivery based on end users' responses during a dialog). The automated nature of the system can also reduce human error from manual data entry.

Returning to the example for leveraging a large distribution of an electronic message for an advertising campaign, dynamically focused offerings provided over multiple communications channels are enabled by the disclosed inventive MEP because it can utilize multiple channels to perform authentication and process authorizations for transactions: electronic mail in combination with SMS messaging, interaction with a web-site in combination with SMS messaging, voice calls in combination with SMS messaging, etc.

Such large distribution electronic mails are conventionally sent in an effort to generate sales and build brand awareness because such mass sent electronic mails are relatively inexpensive to devise and transmit. However, such mass sent electronic mails also have a relatively low customer conversion rate.

To the contrary, in accordance with the disclosed embodiments, an initial, mass sent electronic mail is not merely a conduit for soliciting new transactions. Rather, the DDM-enhanced mediator provides the ability to establish associations and enable migration to different communication/marketing channels. Moreover, the cost of sending a follow up or further communication to a user (whether it be using the same communication channel or a more expensive channel) need only be incurred for users who responded to a previous communication, or committed to a previous offer.

In a CRM-related implementation, the DDM enables the ability to establish associations for messages sent to and received from a user via electronic mail and via the user's mobile device. Additionally, because of the personal nature of users' mobile devices, the DDM-enhanced mediator can establish authentication and security while gathering data regarding user's transactions and delivering offerings and marketing campaigns that increase user engagement and customer conversion.

Thus, the disclosed DDM-enhanced mediator can provide an enhanced marketing campaign that can be dynamically focused to use different cost communication channels to increase the effectiveness of the campaign. For example, disclosed embodiments can utilize a first phase, in which electronic mails are sent to a large number of recipients. Thus, the inventive MEP may be utilized to reach millions of users with zero or little cost (e.g., via an electronic mail message). As mentioned above, the initial phase may be a trial or free offer. That offer message may include a link to an Internet site where users may register for a trial or free service or product in exchange for registration information, as is understood and disclosed in U.S. patent application Ser. No. 13/616,525, filed Sep. 14, 2012, entitled "METHOD AND SYSTEM FOR MEDIATING AND PROVISIONING SERVICES," the contents of which being incorporated herein by reference in their entirety.

Alternatively, the offer could require payment but that payment could be authorized by replying to an SMS message sent to the user's mobile device. Such an implementation may have particular utility if the user has a pre-existing registration with a processor or payment provider.

In accordance with at least one implementation, an initial electronic mail may include a plurality of link provided next to a plurality of corresponding products identified in the message, wherein the user can select the link to send a message indicating which product the user is interested in.

As mentioned above, the initial phase may be a trial or free offer. That offer message may include a link to an Internet site where users may register for a trial or free service or product in exchange for registration information. Alternatively, the offer could require payment but that payment could be authorized by replying to an SMS message sent to the user's mobile device. Such an implementation may have particular utility if the user has a pre-existing registration with a processor or payment provider.

In another implementation, the DDM-enhanced mediator could be used to facilitate completion of a transaction initiated on a web-site over the Internet. For example, following placing items in a conventional shopping card at a service/product provider's web-site, the user could request that a SMS message be generated and transmitted to their mobile device. In such an implementation, the user could simply reply to the SMS message to trigger authorization to purchase the items. In a similar implementation, an electronic mail could be generated with a link that enables the user to input their mobile number to subsequently generate an SMS message for reply-authorization. Each of these implementations could be combined with conventional account identifier/password combinations at a web-site to further improve authentication and security.

In yet another implementation, the DDM-enhanced mediator could be used to facilitate completion of a telecommunication connection such as roaming to a foreign communication network or Wireless Local Area Network (WLAN) hotspot and possible charging for the connection. For example, airports, railway stations, harbor terminals, hotels, department stores, restaurants, cafés, sports areas are various similar places, which conventionally have WLAN networks to which users can connect for free or for a fee. The DDM enhanced mediator could be configured to send an offer to a user to connect to the WLAN network. This may be sent in response to the WLAN network detecting the user's mobile phone or computer and identifying the user by the IMSI, IMEI, MAC address or similar hard address as described above.

In one potential implementation, the user may receive a query, e.g., on a web-page associated with the WLAN, requesting the user to accept terms (e.g., contractual and/or financial) for the WLAN connection prior to being able to fully connect to the WLAN. Such a request might be replied to by a user by simply by providing the user's mobile phone number or if the user's device is earlier recognized by the DDM-enhanced mediator only by one letter response to accept the connection terms can be done to generate the connection. In a similar implementation, an electronic mail could be generated with a link that enables the user to input their mobile number to subsequently generate an SMS message for reply-authorization and charging. Each of these implementations could be combined with conventional account identifier/password combinations at a web-site to further improve authentication and security.

These particular implementations have utility in that they reduce or eliminate the complexity, time and frustration required for users to respond to or utilize new products/services or interact with new product/service providers. For example, a user may authorize population of a web-form or access to personal data via an API by responding to a text message sent to their mobile device. That text message could be generated by simply selecting a link on a web-form at a web-site or providing the mobile number to a call center operator. In this way, the DDM-enhanced mediator and the overall inventive MEP can increase user engagement and customer conversion and satisfaction and efficiency. As a result, the functionality of the disclosed embodiments of the DDM-enhanced moderator and the inventive MEP provide significant utility for marketing campaigns.

Additionally, the scalability of the DDM-enhanced moderator has particular utility for marketing campaigns. This is in part because N-dimensional matrix structure of the DDM is extremely efficient and almost infinitely scalable.

The DDM provides scalability throughout the methodologies. For example, since each session may be tied to the cross-coordinates of the reply address and the sender-address within the DDM matrix, a massive number of sessions are possible with a limited number of provisioned reply addresses. As a purely hypothetical example, a pool of 1,000 provisioned reply addresses and seven billion recipient addresses (one for every person on earth) would create enough cells within the DDM matrix for seven trillion sessions.

Adding five reply options to the third axis of the DDM matrix and configuring those reply options to pre-configured dialogues would explode the number of sessions within the matrix to 35 trillion. Thus, scalability is not a function of address size, but is more generally limited to the size of the database used.

Moreover, the disclosed embodiments' approach to maintaining persistent sessions need not rely on conventionally used open-IP connections. Rather, the DDM-enhanced mediator can maintain persistent (asynchronous) session states in non-volatile memory, conserving scarce volatile memory of servers. Thus, sessions can remain dormant in non-volatile memory until either a trigger from a service/product provider's enterprise cloud application or platform triggers an event, or a mobile customer sends a message corresponding to an existing dialogue.

Thus, disclosed embodiments enable provisioning and delivery of value added services for mobile device users via their mobile devices. Thus, in accordance with the disclosed embodiments, a user may use their mobile device to communicate with one or more service providers directly or through a mediating server. Communications with the mobile device may be performed via voice, text or SMS messages, electronic mail, etc.

Although the present invention has been described in considerable detail with reference to certain preferred versions thereof, other versions are possible. Therefore the spirit and scope of the appended claims should not be limited to the preferred versions herein.

I claim:

1. A method for communicating with a plurality of users over at least one communication network, the method comprising:
   transmitting first digital messages from a server coupled to the at least one communication network to a plurality of users at their respective mobile communication terminals, the first digital messages each containing a destination address for each of the plurality of users, a specified reply address and at least one offer for a product or service;
   receiving a reply communication from at least one user that received one of the first digital messages at the user's mobile communication terminal, wherein the received reply communication accepts at least one offer for a product or service contained in the one of the first digital messages; and
   authenticating the received reply communication as being sent from the at least one user in response to:
      an originating address for the reply communication matching a destination address of the at least one user's mobile communication terminal for the one of the first digital messages transmitted from the server to the at least one user's mobile communication terminal; and
      the specified reply address in the one of the first digital messages sent to user's mobile communication terminal matching the address at which the reply communication was received, wherein the specified reply address in the one of the first digital messages sent to the user's mobile communication terminal is a basis for differentiating reply communications received from other users' mobile communication terminals in response to the first digital messages.

2. The method of claim 1, wherein the originating addresses for the reply communications are also used as a basis for differentiating the received reply communications sent in response to the first messages.

3. The method of claim 1, further comprising analyzing content of each received reply communication received from the plurality of users and the originating addresses for those received reply communications and generating session identification data based on that analysis for each of the plurality of users who replied.

4. The method of claim 3, further comprising transmitting second digital messages from a second server coupled to the at least one communication network to each of the plurality of users who replied to the first digital messages based on the session identification data, wherein the respective session identification data for each of the plurality of users who replied to the first digital messages is included in the corresponding second digital message sent to the respective users.

5. The method of claim 4, wherein the second digital messages are electronic mail messages.

6. The method of claim 4, wherein both the first and second digital messages are electronic mail messages.

7. The method of claim 4, wherein both the first and second digital messages are SMS messages.

8. The method of claim 4, further comprising receiving a reply communication from at least one user that received the second digital message, wherein the received reply communication for the second digital message from the at least one user is associated with the received reply communication from the at least one user for the first digital message based on the session identification data for the at least one user.

9. The method of claim 8, wherein the first digital messages are sent via electronic mail to electronic mail addresses and the second digital messages are SMS messages sent to mobile phone numbers.

10. The method of claim 9, further comprising associating the session identification data with an electronic mail address and a mobile phone number for at least one user that replied to the first and second digital messages.

11. The method of claim 1, wherein a plurality of first digital messages are sent to each of a plurality users and the method further comprises determining which of the plurality of the first digital messages a user responded to based on semantic analysis of content of the received reply communication received from the user, wherein the semantic analysis determines whether the content of the received reply communication corresponds to one of the plurality of first digital messages sent to the responding user.

12. The method of claim 1, wherein the first digital messages are electronic mail messages.

13. The method of claim 1, wherein the first digital messages are SMS messages.

14. The method of claim 4, wherein the second digital messages are SMS messages.

15. The method of claim 1, wherein the at least one offer includes a link, that, when activated, triggers display of a web page or web form associated with the product or service in the at least one offer.

16. The method of claim 3, wherein the at least one offer includes a link, that, when activated, triggers display of a web page or web form associated with the product or service in the at least one offer.

17. The method of claim 16, further comprising gathering user data input from the web page or web form and associating the user data input with the session identification data for the user.

18. A system for sending messages, the system comprising at least one server that transmits digital messages including first digital messages over at least one communication network to a plurality of users at their respective mobile communication terminals, the first digital messages each containing a destination address for each of the plurality of users, a specified reply address and at least one offer for a product or service, wherein the at least one server receives a reply communication from at least one user that received one of the first digital messages at the user's mobile communication terminal, wherein the received reply communication accepts at least one offer for a product or service contained in the one of the first digital messages, and the at least one server authenticates the received reply communication as being sent from the at least one user in response to:
    an originating address for the reply communication matching a destination address of the at least one user's mobile communication terminal for the one of the first digital messages transmitted from the server to the at least one user's mobile communication terminal; and
    the specified reply address in the one of the first digital messages sent to user's mobile communication terminal matching the address at which the reply communication was received,
    wherein the specified reply address in the one of the first digital messages sent to the user's mobile communication terminal is a basis for differentiating reply communications received from other users' mobile communication terminals in response to the first digital messages.

19. The system of claim 18, wherein the originating addresses for the reply communications are also used as a basis for differentiating the received reply communications to the first messages.

20. The system of claim 18, wherein the at least one server analyzes content of each received reply communication received from the plurality of users and the originating addresses for those received reply communications and generates and stores session identification data in a memory coupled to and accessible by the at least one server based on that analysis for each of the plurality of users who replied.

21. The system of claim 20, further comprising a second server that transmits second digital messages and is coupled to at least one other communication network, wherein the second digital messages are transmitted to each of the plurality of users who replied to the first digital messages based on the session identification data, wherein the respective session identification data for each of the plurality of users who replied to the first digital messages is included in the corresponding second digital message sent to the respective user.

22. The system of claim 21, wherein the second digital messages are electronic mail messages.

23. The system of claim 21, wherein both the first and second digital messages are electronic mail messages.

24. The system of claim 21, wherein both the first and second digital messages are SMS messages.

25. The system of claim 21, wherein the second at least one server receives a reply communication from at least one user that received the second digital message, wherein the received reply communication for the second digital message from the at least one user is associated with the reply communication from the at least one user for the first digital message based on the session identification data for the at least one user.

26. The system of claim 25, wherein the first digital messages are sent via electronic mail to electronic mail addresses and the second digital messages are SMS messages sent to mobile phone numbers.

27. The system of claim 26, further comprising associating the session identification data with an electronic mail address and a mobile phone number for at least one user that replied to the first and second digital messages.

28. The system of claim 18, wherein a plurality of first digital messages are sent to each of a plurality users and a determination of which of the plurality of the first digital messages a user responded to is performed based on semantic analysis of content of the received reply communication received from the user, wherein the semantic analysis determines whether the content of the received reply communication corresponds to one of the plurality of first digital messages sent to the responding user.

29. The system of claim 18, wherein the first digital messages are electronic mail messages.

30. The system of claim 18, wherein the first digital messages are SMS messages.

31. The system of claim 21, wherein the second digital messages are a SMS message.

32. The system of claim 18, wherein the at least one offer includes a link, that, when activated, triggers display of a web page or web form associated with the product or service in the at least one offer.

33. The system of claim 21, wherein the at least one offer includes a link, that, when activated, triggers display of a web page or web form associated with the product or service in the at least one offer.

34. The system of claim 33, further comprising gathering user data input from the web page or web form and associating it with the session identification data for the user.

* * * * *